US011514731B2

(12) United States Patent
Liu et al.

(10) Patent No.: US 11,514,731 B2
(45) Date of Patent: Nov. 29, 2022

(54) METHOD AND SYSTEM FOR REMOTE VEHICLE DIAGNOSTICS

(71) Applicant: LAUNCH TECH CO., LTD., Shenzhen (CN)

(72) Inventors: Jun Liu, Shenzhen (CN); Zhijian Chen, Shenzhen (CN)

(73) Assignee: LAUNCH TECH CO., LTD., Shenzhen (CN)

( * ) Notice: Subject to any disclaimer, the term of this patent is extended or adjusted under 35 U.S.C. 154(b) by 447 days.

(21) Appl. No.: 16/611,949

(22) PCT Filed: Aug. 29, 2019

(86) PCT No.: PCT/CN2019/103391
§ 371 (c)(1),
(2) Date: Nov. 8, 2019

(87) PCT Pub. No.: WO2021/035634
PCT Pub. Date: Mar. 4, 2021

(65) Prior Publication Data
US 2021/0065480 A1 Mar. 4, 2021

(51) Int. Cl.
*G07C 5/08* (2006.01)
*H04L 12/40* (2006.01)
(Continued)

(52) U.S. Cl.
CPC .......... *G07C 5/0816* (2013.01); *G07C 5/008* (2013.01); *G07C 5/0808* (2013.01); *H04L 12/40* (2013.01);
(Continued)

(58) Field of Classification Search
CPC .... G07C 5/0816; G07C 5/008; G07C 5/0808; H04W 4/40; H04L 12/40; H04L 29/06068; H04L 2012/40215–40273
See application file for complete search history.

(56) References Cited

U.S. PATENT DOCUMENTS

2002/0110146 A1 8/2002 Thayer et al.
2005/0267655 A1* 12/2005 Gessner .............. B60R 16/0231
701/29.1
(Continued)

FOREIGN PATENT DOCUMENTS

CN 103398855 A 11/2013
CN 106774230 A 5/2017
(Continued)

OTHER PUBLICATIONS

The Extended European Search Report issued in corresponding EP Application No. EP 19797972.7, dated Jun. 8, 2021, pp. 1-8.
(Continued)

*Primary Examiner* — Calvin Cheung
(74) *Attorney, Agent, or Firm* — Hauptman Ham, LLP (57) ABSTRACT

A method and system for remote vehicle diagnostics are provided. The method is applicable to a remote vehicle diagnostic system including a vehicle diagnostic terminal and a vehicle connector. A remote communication connection between the vehicle diagnostic terminal and the vehicle connector is established via a preset programming interface. The vehicle diagnostic terminal receives diagnostic instruction data of a diagnostic application. The vehicle diagnostic terminal transmits the diagnostic instruction data to the vehicle connector via the preset programming interface by way of the remote communication. The vehicle connector converts the diagnostic instruction data into first data in a first data format, and performs a diagnostic operation corresponding to the first data, where the first data format is readable by a vehicle.

15 Claims, 3 Drawing Sheets

(51) Int. Cl.
*H04W 4/40* (2018.01)
*G07C 5/00* (2006.01)
*H04L 69/08* (2022.01)

(52) U.S. Cl.
CPC .............. *H04L 69/08* (2013.01); *H04W 4/40* (2018.02); *H04L 2012/40215* (2013.01); *H04L 2012/40273* (2013.01)

(56) References Cited

U.S. PATENT DOCUMENTS

| | | | |
|---|---|---|---|
| 2006/0101311 A1* | 5/2006 | Lipscomb | G07C 5/008 714/47.1 |
| 2011/0276218 A1 | 11/2011 | Dwan et al. | |
| 2012/0046826 A1 | 2/2012 | Panko | |
| 2014/0012458 A1 | 1/2014 | Park | |
| 2015/0228127 A1 | 8/2015 | Ross | |

FOREIGN PATENT DOCUMENTS

| | | | | |
|---|---|---|---|---|
| CN | 107526353 A | 12/2017 | | |
| CN | 108199942 A | 6/2018 | | |
| DE | 102005027378 B3 * | 11/2006 | ......... | G05B 23/0216 |
| WO | 2008127247 A1 | 10/2008 | | |
| WO | 2019134706 A1 | 7/2019 | | |

OTHER PUBLICATIONS

International Search Report issued in International Application No. PCT/CN2019/103391, dated May 27, 2020, pp. 1-5, National Intellectual Property Administration, Beijing, China.

* cited by examiner

METHOD AND SYSTEM FOR REMOTE VEHICLE DIAGNOSTICS

RELATED APPLICATION

The present application is a National Phase of International Application Number PCT/CN2019/103391, filed Aug. 29, 2019.

TECHNICAL FIELD

This disclosure relates to the technical field of vehicle diagnostics, and more particularly to a method and system for remote vehicle diagnostics and a system.

BACKGROUND

An on-board diagnostic system allows a diagnostic device to diagnose vehicles and provide the vehicles with programming services, so that faults occurring in the vehicle can be diagnosed, or the vehicle can enable programmed functions or perform an operation corresponding to programming by programming the vehicle. However, some existing diagnostic standards (e.g., an SAE J2534 standard and an ISO 22900 standard) do not define how to implement remote diagnostics. In addition, most of existing remote vehicle diagnostic systems are based on an application layer, an network layer, or a data link layer of controller area net-work bus (CAN-BUS) communication for remote diagnostics, however, application-layer-based remote diagnostics can only support specific diagnostic device and has poor compatibility.

SUMMARY

According to embodiments of the present disclosure, a method for remote vehicle diagnostics and a remote vehicle diagnostic system are provided, which can realize remote vehicle diagnostics and programming based on a diagnostic device that meets a preset vehicle diagnostic standard, thereby improving compatibility of vehicle diagnostics.

In a first aspect of the present disclosure, a method for remote vehicle diagnostics is provided. The method is applicable to a remote vehicle diagnostic system. The system includes a vehicle diagnostic terminal and a vehicle connector disposed on a vehicle. The vehicle diagnostic terminal includes a preset programming interface and a diagnostic application. The method includes the following. The vehicle diagnostic terminal establishes a remote communication connection with the vehicle connector via the preset programming interface. The vehicle diagnostic terminal receives diagnostic instruction data of the diagnostic application via the preset programming interface. The vehicle diagnostic terminal transmits the diagnostic instruction data to the vehicle connector via the preset programming interface by the remote communication connection. The vehicle connector converts the diagnostic instruction data into first data in a first data format and performs a diagnostic operation corresponding to the first data, where the first data format is readable by the vehicle.

In a second aspect of the present disclosure, a method for remote vehicle diagnostics is provided. The method is applicable to a vehicle diagnostic terminal. The vehicle diagnostic terminal includes a preset programming interface and a diagnostic application. The method includes the following. A remote communication connection with a vehicle connector is established via the preset programming interface. Diagnostic instruction data of the diagnostic application is received via the preset programming interface. The diagnostic instruction data is transmitted to the vehicle connector via the preset programming interface by the remote communication connection. At the vehicle connector, the diagnostic instruction data is converted into first data in a first data format and a diagnostic operation corresponding to the first data is performed.

In a third aspect of the present disclosure, a method for remote vehicle diagnostics is provided. The method is applicable to a vehicle connector. The method includes the following. A remote communication connection with a vehicle diagnostic terminal is established. Diagnostic instruction data transmitted by the vehicle diagnostic terminal is received, where the diagnostic instruction data is transmitted by a diagnostic application installed in the vehicle diagnostic terminal and is received via a preset programming interface. The diagnostic instruction data is converted into first data in a first data format and a diagnostic operation corresponding to the first data is performed, where the first data format is readable by a vehicle.

In a fourth aspect of the present disclosure, a vehicle diagnostic terminal is provided. The vehicle diagnostic terminal includes a memory and a processor. The memory is configured to store executable computer programs including a preset programming interface and a diagnostic application. The processor is configured to invoke the executable computer programs. The executable computer programs which, when executed by the processor, are operable with the processor to carry out following actions. A remote communication connection with a vehicle connector is established via the preset programming interface. Diagnostic instruction data of the diagnostic application is received via the preset programming interface. The diagnostic instruction data is transmitted to the vehicle connector via the preset programming interface by the remote communication connection. At the vehicle connector, the diagnostic instniction data is converted into first data in a first data format and a diagnostic operation corresponding to the first data is performed.

In a fifth aspect of the present disclosure, a vehicle connector is provided. The vehicle connector includes a memory and a processor. The memory is configured to store executable computer programs. The processor is configured to invoke the executable computer programs. The executable computer programs which, when executed by the processor, are operable with the processor to carry out following actions. A remote communication connection with a vehicle diagnostic terminal is established. Diagnostic instruction data transmitted by the vehicle diagnostic terminal is received, where the diagnostic instruction data is transmitted by a diagnostic application installed in the vehicle diagnostic terminal and being received via a preset programming interface. The diagnostic instruction data is converted into first data in a first data format and a diagnostic operation corresponding to the first data is performed, where the first data format is readable by a vehicle.

In a sixth aspect of the present disclosure, a remote vehicle diagnostic system is provided. The system includes the vehicle connector as described in the fifth aspect and the vehicle diagnostic terminal as described in the fourth aspect.

In a seventh aspect of the present disclosure, a computer readable storage medium is provided. The computer readable storage medium is configured to store computer programs. The computer programs are operable with a computer to execute part or all of the operations described in the first aspect of embodiments of the present disclosure.

In an eighth aspect of the present disclosure, a computer program product is provided. The computer program product includes a non-transitory computer readable storage medium configured to store computer programs. The computer programs are operable with a computer to execute part or all of the operations described in the first aspect of embodiments of the present disclosure. The computer program product may be a software installation package.

The implementation of embodiments of the present disclosure has the following beneficial effects.

As can be seen, the method and system for remote vehicle diagnostics described in embodiments of the present disclosure are applicable to the remote vehicle diagnostic system, where the system includes the vehicle diagnostic terminal and the vehicle connector disposed on the vehicle, and the vehicle diagnostic terminal includes the preset programming interface and the diagnostic application. The vehicle diagnostic terminal loads, with the diagnostic application, the preset programming interface that meets a preset vehicle diagnostic standard. The vehicle diagnostic terminal establishes, via the preset programming interface, an internet connection with the vehicle connector. The vehicle diagnostic terminal receives, via the preset programming interface, the diagnostic instruction data of the diagnostic application according to the preset vehicle diagnostic standard. The vehicle diagnostic terminal transmits, via the preset programming interface, the diagnostic instruction data to the vehicle connector through Internet. The vehicle connector converts the diagnostic instruction data into first data readable to the vehicle, where the first data has a data format readable by the vehicle. As such, remote communication with the vehicle connector can be performed via the preset programming interface to realize remote vehicle diagnostics. Moreover, data format conversion is performed on the diagnostic instruction data to obtain the first data, in this way, vehicle diagnostics can be performed on any vehicle, and therefore, the compatibility of the vehicle diagnostics can be improved.

BRIEF DESCRIPTION OF THE DRAWINGS

In order to describe technical solutions of embodiments of the present disclosure or the related art more clearly, the following will give a brief description of accompanying drawings used for describing the embodiments of the present disclosure or the related art.

DETAILED DESCRIPTION

In order for those skilled in the art to better understand technical solutions of the present disclosure, technical solutions of embodiments of the present disclosure will be described clearly and completely with reference to accompanying drawings in the embodiments of the present disclosure. All other embodiments obtained by those of ordinary skill in the art based on the embodiments of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" referred to herein means that particular features, structures, or properties described in conjunction with the embodiments may be defined in at least one embodiment of the present disclosure. The phrase "embodiment" appearing in various places in the specification does not necessarily refer to the same embodiment or an independent/alternative embodiment that is mutually exclusive with other embodiments. Those skilled in the art will understand expressly and implicitly that an embodiment described herein may be combined with other embodiments.

Figure 1:
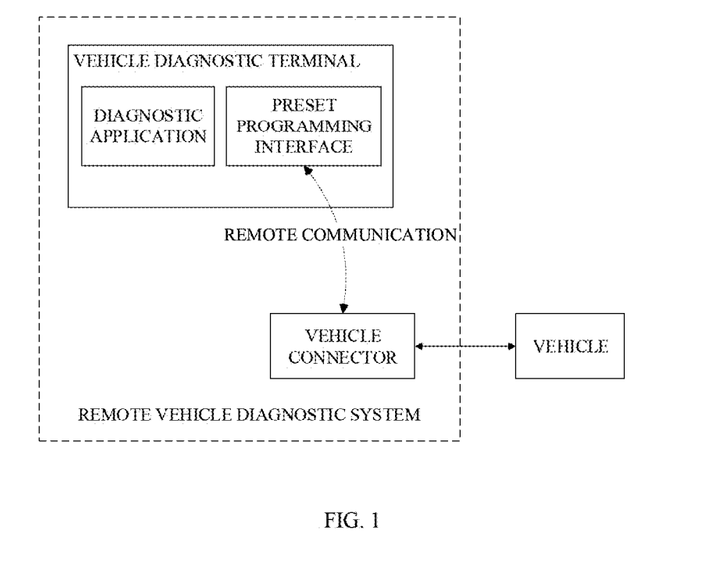
FIG. 1 is a schematic structural diagram illustrating a remote vehicle diagnostic system according to embodiments.

FIG. 1 is a schematic structural diagram illustrating a remote vehicle diagnostic system according to embodiments. As illustrated in FIG. 1, the remote vehicle diagnostic system includes a vehicle diagnostic terminal and a vehicle connector disposed on a vehicle, and the vehicle diagnostic terminal includes a preset programming interface and a diagnostic application.

The vehicle connector may include any of a pass-thru device, a modular vehicle communication interface (MVCI) device, and a telematics BOX (T-BOX) device, where the T-BOX refers to an on-board infotainment device installed in a vehicle. The vehicle connector may be disposed on a vehicle and can be communicably coupled with the vehicle to implement a vehicle diagnostic service. Remote communication can be performed between the vehicle connector and the preset programming interface of the vehicle diagnostic terminal to realize data communication.

The vehicle diagnostic terminal may include various handheld terminals, on-board terminals, wearable devices, computing terminals with wireless communication functions, or other processing terminals connected to a wireless modem, as well as various forms of user equipment (UE), mobile station (MS), terminal device, and so on.

The preset programming interface can be coupled with a diagnostic application that meets a preset diagnostic standard. The preset programming interface can also establish a communication connection with the vehicle connector for data communication.

According to the disclosure, remote vehicle diagnostics based on the preset diagnostic standard can be realized by a two-way communication between the vehicle connector and the preset programming interface in the vehicle diagnostic terminal.

Hereinafter, embodiments will be described in detail.

Figure 2:
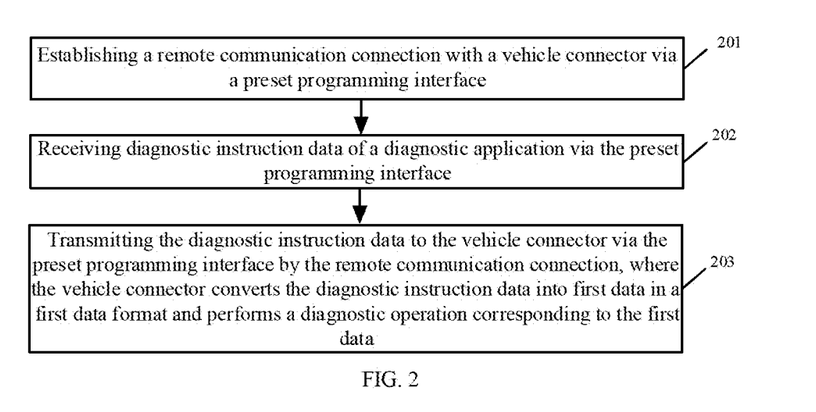
FIG. 2 is a schematic flowchart illustrating a method for remote vehicle diagnostics according to embodiments.

FIG. 2 is a schematic flowchart illustrating a method for remote vehicle diagnostics according to embodiments. The method for remote vehicle diagnostics of the embodiments is applicable to a vehicle diagnostic terminal. The vehicle diagnostic terminal includes a preset programming interface and a diagnostic application. As illustrated in FIG. 2, the method for remote vehicle diagnostics includes the following.

At 201, a remote communication connection with a vehicle connector is established via the preset programming interface.

The preset programming interface is a programming interface that meets a vehicle diagnostic standard. The preset programming interface may include a J2534 interface or a datalink protocol data unit (D-PDU) interface. The J2534 interface is a programming interface coupled with application driver software of an upper layer and a vehicle diagnostic terminal driver of a lower layer. The J2534 interface or the D-PDU interface are standardized vehicle communication interfaces.

According to embodiments, the vehicle diagnostic terminal can establish a remote communication connection with the vehicle connector via the preset programming interface, and so remote data communication between the vehicle diagnostic terminal and the vehicle connector can be achieved.

In some embodiments, before the remote communication connection with the vehicle connector is established via the preset programming interface at 201, the method further includes the following. The diagnostic application loads the preset programming interface that meets a preset diagnostic standard.

The preset diagnostic standard may be an SAE J2534 standard or an ISO 22900-2 standard.

In some embodiments, the vehicle diagnostic terminal may include a driving application of the preset programming interface. A communication connection between the driving application and the diagnostic application can be implemented via the preset programming interface, and data communication can be performed by establishing a connection with the vehicle connector via the preset programming interface.

In some embodiments, the remote communication connection is performed in a server data forwarding manner or a peer-to-peer (P2P) communication manner.

At 202, diagnostic instruction data of the diagnostic application is received via the preset programming interface.

The diagnostic application may be application programs in the vehicle diagnostic terminal for implementing vehicle diagnostics or programming functions.

The diagnostic instruction data may include a vehicle data acquisition request, a vehicle diagnostic operation command, and the like. The vehicle data acquisition request referred to herein means that the vehicle diagnostic terminal needs to acquire data generated during vehicle operation from a vehicle. As an example, the vehicle data acquisition request includes a name and a data type of requested data, and so on. The vehicle diagnostic operation command refers to a command directed to a vehicle connector of a vehicle and used to indicate performing vehicle diagnostics on the vehicle.

According to embodiments, the vehicle diagnostic terminal can receive, via the preset programming interface, the diagnostic instruction data of the diagnostic application according to the preset diagnostic standard. Based on the preset diagnostic standard, the diagnostic instruction data obtained can be identified and read by the preset programming interface.

At 203, the diagnostic instruction data is transmitted to the vehicle connector via the preset programming interface by the remote communication connection, at the vehicle connector, the diagnostic instruction data is converted into first data in a first data format and a diagnostic operation corresponding to the first data is performed.

The vehicle connector may include any of a pass-thru device, an MVCI device, and a T-BOX device, where the T-BOX refers to an on-board infotainment device installed in a vehicle.

The first data format of the first data is a standard format defined in CANBUS (ISO 11898) protocol, diagnostic communication over internet protocol (DOIP) (ISO 13400), keyword protocol (KWP) (ISO 14230), IOS 9141 protocol, SAE J1850 protocol, or K-line protocol. ISO 11898 is a international standard for the CANBUS protocol, ISO 13400 is a international standard for the DOIP, and ISO 14230 is a international standard for the KWP.

According to embodiments, after the vehicle diagnostic terminal receives the diagnostic instruction data of the diagnostic application via the preset programming interface according to the preset diagnostic standard, the diagnostic instruction data can be transmitted to the vehicle connector via the preset programming interface in a remote communication manner. At the vehicle connector, the diagnostic instruction data is received, the diagnostic instruction data is converted into the first data of the first data format, and the diagnostic operation corresponding to the first data is performed.

As an example, when vehicle diagnostics on a certain vehicle needs to be performed, a connection with the vehicle connector can be established via the preset programming interface of the vehicle diagnostic terminal. The preset programming interface may be a J2534 interface or a D-PDU interface, where the J2534 interface satisfies the SAE J2534 standard and the D-PDU interface satisfies the ISO 22900-2 standard. The diagnostic instruction data of the diagnostic application (e.g., a vehicle diagnostic operation command) can be received via the J2534 interface or the D-PDU interface. The vehicle diagnostic terminal can transmits, via the J2534 interface or the D-PDU interface, the diagnostic instruction data to the vehicle connector in a remote communication manner. At the vehicle connector, in order to enable the diagnostic instruction data to be readable by a vehicle, the diagnostic instruction data is converted into first data in a first data format (e.g., a standard format defined in CANBUS protocol, DOIP, KWP, IOS 9141 protocol, SAE J1850 protocol, or K-line protocol). As an implementation, if the vehicle is able to identify the standard format defined in the CANBUS protocol, the vehicle connector can convert the data format of the diagnostic instruction data to be the standard format defined in the CANBUS protocol. As such, data format conversion is performed on the diagnostic instruction data to obtain the first data. In this way, vehicle diagnostics can be performed on any vehicle, thereby improving compatibility of the vehicle diagnostics.

In some embodiments, the method further includes the following. At A1, vehicle diagnostic data returned by the vehicle connector is received, where the vehicle diagnostic data is obtained by performing, by the vehicle connector, the diagnostic operation corresponding to the first data. At A2, the vehicle diagnostic data is converted into second data in a second data format, where the second data format is a data format readable by the preset programming interface. At A3, the second data is analyzed and processed, and an analysis result is presented.

The vehicle diagnostic data may be diagnostic data that is fed back in response to a vehicle data acquisition request or a vehicle diagnostic operation command.

In some embodiments, the vehicle connector and a vehicle can be coupled with each other through an in-vehicle network, and the in-vehicle network may include a vehicle area network or a vehicle Ethernet. As an example, the vehicle connector can communicate with an electronic control unit of the vehicle through the in-vehicle network; the vehicle connector obtains vehicle diagnostic data stored in the electronic control unit of the vehicle, where the vehicle diagnostic data includes various vehicle operating parameters generated when the vehicle is in use; alternatively, the vehicle connector reads vehicle diagnostic data via an on-board diagnostic (OBD) interface of an OBD system in the vehicle, and then the vehicle diagnostic data is transmitted to the vehicle connector coupled with the vehicle. In this case, the vehicle diagnostic data can be transmitted to the vehicle diagnostic terminal coupled with the vehicle connector. As such, the vehicle diagnostic terminal can receive the vehicle diagnostic data via the preset programming interface.

The vehicle diagnostic data has a data format readable by the vehicle. For example, the data format is a standard format defined in CANBUS protocol, DOIP, or the K-line protocol. Considering that the data format of the vehicle diagnostic data may be inconsistent with a data format readable by the preset programming interface, the vehicle diagnostic data is converted into the second data in the second data format according to the preset vehicle diagnostic standard, in this way, the diagnostic application can identify the second data. By converting the data format of the vehicle diagnostic data to obtain the second data, it is possible to perform vehicle diagnostics for any vehicle, thereby improving compatibility of the vehicle diagnostics.

In some embodiments, the vehicle diagnostic terminal can further analyze and process the second data to obtain an analysis result and present the analysis result. As an example, the vehicle diagnostic terminal determines whether each parameter in the vehicle diagnostic data belongs to a corresponding preset parameter range. If not belongs to a correspondence preset parameter range, a corresponding fault code can be displayed and give an indication that an abnormality parameter exists.

As can be seen, the method for remote vehicle diagnostics described in embodiments of the present disclosure is applicable to the vehicle diagnostic terminal, where the vehicle diagnostic terminal includes the preset programming interface and the diagnostic application. A remote communication connection with the vehicle connector can be established via the preset programming interface. The diagnostic instruction data of the diagnostic application can be received via the preset programming interface. The diagnostic instruction data can be transmitted to the vehicle connector via the preset programming interface by way of the remote communication. At the vehicle connector, the diagnostic instruction data can be converted into the first data in the first data format and the diagnostic operation corresponding to the first data can be performed. As such, remote communication with the vehicle connector can be performed via the preset programming interface to realize remote vehicle diagnostics. Moreover, data format conversion is performed on the diagnostic instruction data to obtain the first data, in this way, vehicle diagnostics can be performed on any vehicle, thereby improving compatibility of the vehicle diagnostics.

Figure 3:
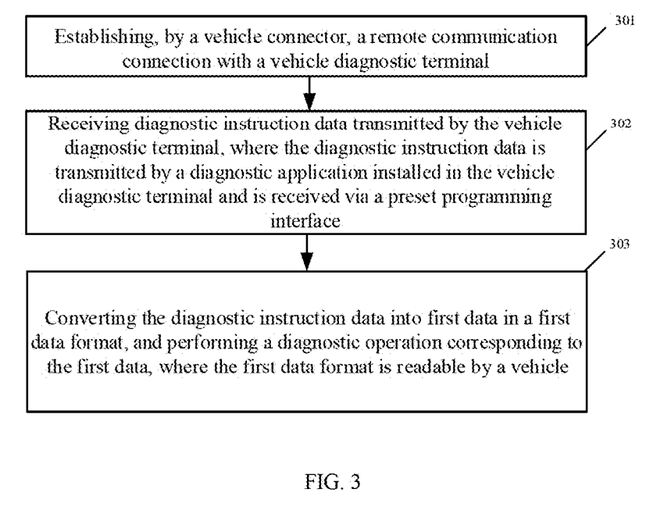
FIG. 3 is a schematic flowchart illustrating a method for remote vehicle diagnostics according to other embodiments.

FIG. 3 is a schematic flowchart illustrating a method for remote vehicle diagnostics according to embodiments. The method for remote vehicle diagnostics of the embodiments is applicable to a vehicle connector. As illustrated in FIG. 3, the method for remote vehicle diagnostics includes the following.

At 301, a vehicle connector establishes a remote communication connection with a vehicle diagnostic terminal.

The vehicle connector may include any of a pass-thru device, an MVCI device, and a T-BOX device, where the T-BOX refers to an on-board infotainment device installed in a vehicle.

According to embodiments, the vehicle connector can establish a remote communication connection with the vehicle diagnostic terminal and therefore, remote data communication between the vehicle diagnostic terminal and the vehicle connector can be achieved.

In some embodiments, the remote communication connection is performed in a server data forwarding manner or a P2P communication manner.

At 302, diagnostic instruction data transmitted by the vehicle diagnostic terminal is received, where the diagnostic instruction data is transmitted by a diagnostic application installed in the vehicle diagnostic terminal and is received via a preset programming interface.

The diagnostic application may be application programs in the vehicle diagnostic terminal for implementing vehicle diagnostics or programming functions.

The diagnostic instruction data may include a vehicle data acquisition request, a vehicle diagnostic operation command, and the like. The vehicle data acquisition request referred to herein means that the vehicle diagnostic terminal needs to acquire data generated during vehicle operation from a vehicle. As an example, the vehicle data acquisition request includes a name and a data type of requested data, and so on. The vehicle diagnostic operation command refers to a command directed to a vehicle connector of a vehicle and used to indicate performing vehicle diagnostics on the vehicle.

According to embodiments, the vehicle diagnostic terminal can receive, via the preset programming interface, the diagnostic instruction data of the diagnostic application according to the preset diagnostic standard Based on the preset diagnostic standard, the diagnostic instruction data obtained can be identified and read by the preset programming interface. Then, the vehicle diagnostic terminal transmits the diagnostic instruction data to the vehicle connector, in this case, the vehicle connector can receive the diagnostic instruction data transmitted by the vehicle diagnostic terminal.

At 303, the diagnostic instruction data is converted into first data in a first data format, and a diagnostic operation corresponding to the first data is performed, where the first data format is a data format readable by a vehicle.

The first data format of the first data is a standard format defined in CANBUS (ISO 11898) protocol, DOIP (ISO 13400), KWP (ISO 14230), IOS 9141 protocol, SAE J1850 protocol, or K-line protocol. ISO 11898 is a international standard for CANBUS protocol, ISO 13400 is a international standard for DOIP, and ISO 14230 is a international standard for KWP.

According to embodiments, after receiving the diagnostic instruction data transmitted by the vehicle diagnostic terminal, the vehicle connector can convert the diagnostic instruction data into the first data of the first data format, such that a vehicle can read the first data. Further, the vehicle connector can perform the diagnostic operation corresponding to the first data, for example, obtaining vehicle diagnostic data of the vehicle.

In some embodiments, the method further includes the following. At B1, vehicle diagnostic data is obtained in accordance with performing the diagnostic operation corresponding to the first data. At B2, the vehicle diagnostic data is returned to the vehicle diagnostic terminal by the remote communication connection, at the vehicle diagnostic terminal, the vehicle diagnostic data is converted into second data in a second data format, and an analysis result is presented after analyzing and processing the second data, where the second data format is readable by the preset programming interface.

The vehicle diagnostic data may be data that is fed back in response to a vehicle data acquisition request or a vehicle diagnostic operation command.

According to embodiments, the vehicle connector and a vehicle can be coupled with each other through an in-vehicle network or through a network of an OBD system in the vehicle. As an example, the vehicle is equipped with an on-board device configured to record vehicle diagnostic data generated when the vehicle is in use; the vehicle diagnostic data is then transmitted to the vehicle connector coupled with the vehicle. In this way, the vehicle diagnostic data can be returned to the vehicle diagnostic terminal via the vehicle connector. As such, the vehicle diagnostic terminal can receive the vehicle diagnostic data via the preset programming interface.

The vehicle diagnostic data has a data format readable by the vehicle. For example, the data format is a standard format defined in CANBUS protocol, DOIP, or K-line protocol. Considering that the data format of the vehicle diagnostic data may be inconsistent with a data format readable by the preset programming interface, the vehicle diagnostic data is converted into the second data in the second data format according to the preset vehicle diagnostic standard, in this way, the diagnostic application can identify the second data.

As can be seen, the method for remote vehicle diagnostics described in embodiments of the present disclosure is applicable to the vehicle connector. A remote communication connection between the vehicle connector and the vehicle diagnostic terminal can be established. The diagnostic instruction data transmitted by the vehicle diagnostic terminal can be received, where the diagnostic instruction data is transmitted by the diagnostic application installed in the vehicle diagnostic terminal and is received via the preset programming interface. The diagnostic instruction data is converted into the first data in the first data format. The diagnostic operation corresponding to the first data is performed, where the first data format is a data format readable by a vehicle. As such, remote communication with the vehicle diagnostic terminal can be performed via the vehicle connector to realize remote vehicle diagnostics. Moreover, data format conversion is performed on the diagnostic instruction data to obtain the first data, in this way, vehicle diagnostics can be performed on any vehicle, thereby improving compatibility of the vehicle diagnostics.

Figure 4:
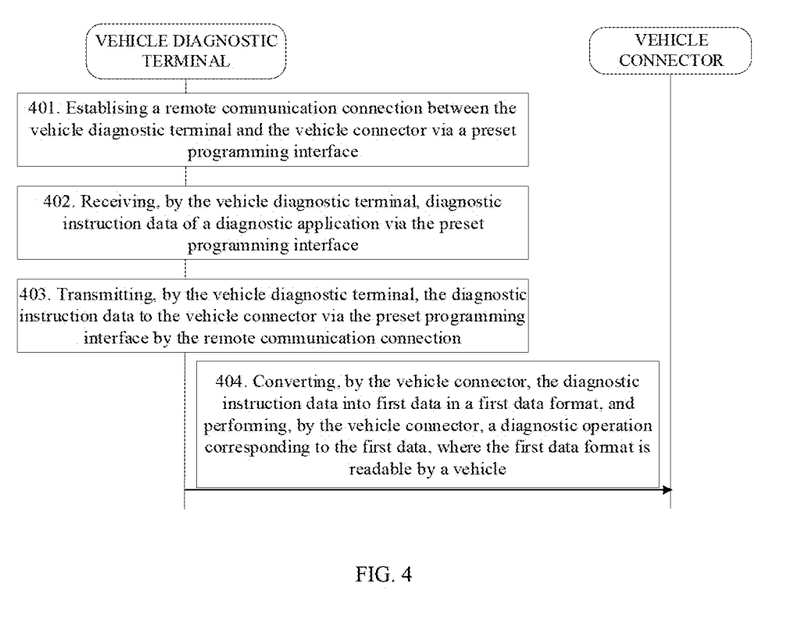
FIG. 4 is a schematic flowchart illustrating a method for remote vehicle diagnostics according to other embodiments.

FIG. 4 is a schematic flowchart illustrating a method for remote vehicle diagnostics according to other embodiments. The method for remote vehicle diagnostics of the embodiments is applicable to a remote vehicle diagnostic system. The system includes a vehicle diagnostic terminal and a vehicle connector disposed on a vehicle, and the vehicle diagnostic terminal includes a preset programming interface and a diagnostic application. As illustrated in FIG. 4, the method for remote vehicle diagnostics includes the following.

At 401, a remote communication connection is established via the preset programming interface between the vehicle diagnostic terminal and vehicle connector.

At 402, the vehicle diagnostic terminal receives diagnostic instruction data of the diagnostic application via the preset programming interface.

At 403, the vehicle diagnostic terminal transmits the diagnostic instruction data to the vehicle connector via the preset programming interface in a remote communication manner.

At 404, the vehicle connector converts the diagnostic instruction data into first data in a first data format, and performs a diagnostic operation corresponding to the first data, where the first data format is a data format readable by the vehicle.

For details of the operations at 401-404, reference can be made to the operations at 201-203 and the operations at 301-303, and it will not be repeated herein.

As can be seen, the method for remote vehicle diagnostics described in embodiments of the present disclosure is applicable to the remote vehicle diagnostic system, where the system includes the vehicle diagnostic terminal and the vehicle connector disposed on the vehicle, and the vehicle diagnostic terminal includes the preset programming interface and the diagnostic application. A connection is established via the preset programming interface between the vehicle diagnostic terminal and the vehicle connector for remote communication. The vehicle diagnostic terminal receives the diagnostic instruction data of the diagnostic application via the preset programming interface. The vehicle diagnostic terminal transmits the diagnostic instruction data to the vehicle connector via the preset programming interface in a remote communication manner. The vehicle connector converts the diagnostic instruction data into the first data in the first data format, and performs the diagnostic operation corresponding to the first data, where the first data format is a data format readable by the vehicle. As such, remote communication between the vehicle connector and the vehicle diagnostic terminal can be performed to realize remote vehicle diagnostics. Moreover, the data format of the diagnostic instruction data is converted to obtain the first data, in this way, vehicle diagnostics can be performed on any vehicle, thereby improving compatibility of the vehicle diagnostics.

Figure 5:
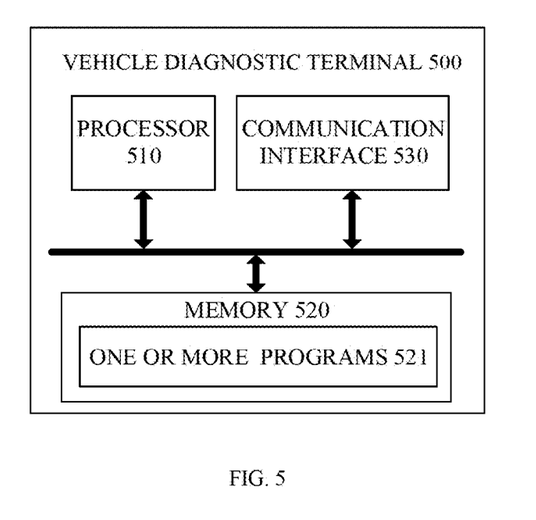
FIG. 5 is a schematic structural diagram illustrating a vehicle diagnostic terminal according to embodiments.

In accordance with above disclosure, FIG. 5 is a schematic structural diagram illustrating a vehicle diagnostic terminal according to embodiments. As illustrated in FIG. 5, a vehicle diagnostic terminal 500 includes a processor 510, a memory 520, a communication interface 530, and one or more executable computer programs 521. The one or more executable computer programs are stored in the memory and configured to be executed by the processor. The executable computer programs include instructions which, when executed by the processor, are operable with the processor to carry out following actions. A remote communication connection with a vehicle connector is established via a preset programming interface. Diagnostic instruction data of a diagnostic application is received via the preset programming interface. The diagnostic instruction data is transmitted to the vehicle connector via the preset programming interface by the remote communication connection. At the vehicle connector, the diagnostic instruction data is converted into first data in a first data format and a diagnostic operation corresponding to the first data is performed.

In some embodiments, before the connection with the vehicle connector is established for remote communication via the preset programming interface, the executable computer programs 521 further include instructions which, when executed by the processor, are operable with the processor to carry out following actions. The diagnostic application loads the preset programming interface that meets a preset diagnostic standard.

In some embodiments, the executable computer programs 521 further include instructions which, when executed by the processor, are operable with the processor to carry out following actions. Vehicle diagnostic data returned by the vehicle connector is received, where the vehicle diagnostic data is obtained by performing, by the vehicle connector, the diagnostic operation corresponding to the first data. The vehicle diagnostic data is converted into second data in a second data format, where the second data format is a data format readable by the preset programming interface. The second data is analyzed and processed and an analysis result is presented.

In some embodiments, the preset programming interface is a programming interface that meets a vehicle diagnostic standard.

In some embodiments, the first data format is a standard format defined in CANBUS protocol, DOIP, KWP, IOS 9141 protocol, SAE J1850 protocol, or K-line protocol.

In some embodiments, the remote communication connection is performed in a server data forwarding manner or a P2P communication manner.

Figure 6:
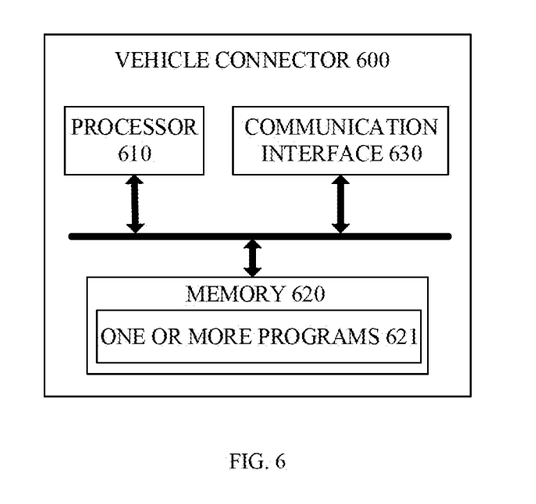
FIG. 6 is a schematic structural diagram illustrating a vehicle connector according to embodiments.

In accordance with above disclosure, FIG. 6 is a schematic structural diagram illustrating a vehicle connector according to embodiments. As illustrated in FIG. 6, a vehicle connector 600 includes a processor 610, a memory 620, a communication interface 630, and one or more executable computer programs 621. The one or more executable computer programs are stored in the memory and configured to be executed by the processor. The executable computer programs include instructions which, when executed by the processor, are operable with the processor to carry out following actions. A remote communication connection with a vehicle diagnostic terminal is established. Diagnostic instruction data transmitted by the vehicle diagnostic terminal is received, where the diagnostic instruction data is transmitted by a diagnostic application installed in the vehicle diagnostic terminal and is received via a preset programming interface. The diagnostic instruction data is converted into first data in a first data format and a diagnostic operation corresponding to the first data is performed, where the first data format is a data format readable by a vehicle.

In some embodiments, the executable computer programs 621 further include instructions which, when executed by the processor, are operable with the processor to carry out following actions. Vehicle diagnostic data is obtained in accordance with performing the diagnostic operation corresponding to the first data. The vehicle diagnostic data is returned to the vehicle diagnostic terminal by the remote communication connection. At the vehicle diagnostic terminal, the vehicle diagnostic data is converted into second data in a second data format, and an analysis result is presented after analyzing and processing the second data, where the second data format is a data format readable by the preset programming interface.

In some embodiments, the preset programming interface is a programming interface that meets a vehicle diagnostic standard.

In some embodiments, the first data format the first data format is a standard format defined in CANBUS protocol, DOIP, KWP, IOS 9141 protocol, SAE J1850 protocol, or K-line protocol.

In some embodiments, the remote communication connection is performed in a server data forwarding manner or a P2P communication manner.

In some embodiments, a computer readable storage medium is further provided. The computer readable storage medium is configured to store computer programs for electronic data interchange. The computer programs are operable with a computer to execute part or all of the operations of any of the method for remote vehicle diagnostics described in the foregoing method embodiments. "Computer" referred to herein includes an electronic device.

In some embodiments, a computer program product is further provided. The computer program product includes a non-transitory computer readable storage medium configured to store computer programs. The computer programs are operable with a computer to execute part or all of the operations of any of the method for remote vehicle diagnostics described in the foregoing method embodiments. The computer program product may be a software installation package. "Computer" referred to herein includes an electronic device.

It is to be noted that, for the sake of simplicity, the foregoing method embodiments are described as a series of action combinations, however, it will be appreciated by those skilled in the art that the present disclosure is not limited by the sequence of actions described. That is because that, according to the present disclosure, certain steps or operations may be performed in other order or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the present disclosure, it should be understood that, the device/apparatus disclosed in embodiments provided herein may be implemented in other manners. For example, the device/apparatus embodiments described above are merely illustrative; for instance, the division of the unit is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to execute all or part of the operations described in the various embodiments of the present disclosure. The memory includes various medium capable of storing program codes, such as a universal serial bus (USB) flash disk, a read-only memory (ROM), a random access memory (RAM), a removable hard disk, disk, compact disc (CD), or the like.

It will be understood by those of ordinary skill in the art that all or part of the operations of the various methods of the embodiments described above may be accomplished by means of a program to instruct associated hardware, the program may be stored in a computer readable memory, which may include a flash memory, a ROM, a RAM, a disk or a CD, and so on.

The foregoing illustrates the embodiments of the present disclosure in detail. The principle and implementations of the present disclosure are described in conjunction with specific examples. The description of the above embodiments are merely used to facilitate understanding of the methods and core concept of the present disclosure. For a person skilled in the art, according to the concept of the present disclosure, specific embodiments and application scopes may be both changed. Based on the above, the present disclosure shall not be understood to be limited to the specification.

What is claimed is:

1. A method for remote vehicle diagnostics, applicable to a vehicle diagnostic terminal comprising a preset programming interface and a diagnostic application, the method comprising:
    establishing, by the vehicle diagnostic terminal, a remote communication connection with a vehicle connector via the preset programming interface;
    receiving, by the vehicle diagnostic terminal, diagnostic instruction data of the diagnostic application via the preset programming interface;
    transmitting, by the vehicle diagnostic terminal, via the preset programming interface, the diagnostic instruction data to the vehicle connector by the remote communication connection, wherein the diagnostic instruction data is used to instruct the vehicle connector to convert the diagnostic instruction data into first data in a first data format and performs a diagnostic operation corresponding to the first data;
    receiving, by the vehicle diagnostic terminal, vehicle diagnostic data returned by the vehicle connector, wherein the vehicle diagnostic data is obtained by performing, by the vehicle connector, the diagnostic operation corresponding to the first data;
    converting, by the vehicle diagnostic terminal, the vehicle diagnostic data into second data in a second data format, wherein the second data format is readable by the preset programming interface; and
    analyzing and processing the second data, and presenting an analysis result by:
        for each parameter in the vehicle diagnostic data:
            determining, by the vehicle diagnostic terminal, whether the parameter belongs to a preset parameter range corresponding to the parameter; and
            displaying, by the vehicle diagnostic terminal, a fault code and giving, by the vehicle diagnostic terminal, an indication that the parameter is an abnormality parameter, upon determining, by the vehicle diagnostic terminal, that the parameter does not belong to the preset parameter range.

2. The method of claim 1, before establishing the remote communication connection with the vehicle connector via the preset programming interface, further comprising:
    loading, by the vehicle diagnostic terminal, with the diagnostic application, the preset programming interface that meets a preset diagnostic standard.

3. The method of claim 1, wherein the preset programming interface is a programming interface that meets a vehicle diagnostic standard.

4. The method of claim 1, wherein the first data format is a standard format defined in controller area network bus (CANBUS) protocol, diagnostic communication over internet protocol (DOIP), keyword protocol (KWP), IOS 9141 protocol, SAE J1850 protocol, or K-line protocol.

5. The method of claim 1, wherein the remote communication connection is performed in a server data forwarding manner or a peer-to-peer (P2P) communication manner.

6. A method for remote vehicle diagnostics, applicable to a vehicle connector, the method comprising:
    establishing, by the vehicle connector, a remote communication connection with a vehicle diagnostic terminal;
    receiving, by the vehicle connector, diagnostic instruction data transmitted by the vehicle diagnostic terminal, the diagnostic instruction data being transmitted by a diagnostic application installed in the vehicle diagnostic terminal and being received via a preset programming interface of the vehicle diagnostic terminal;
    converting, by the vehicle connector, the diagnostic instruction data into first data in a first data format;
    performing, by the vehicle connector, a diagnostic operation corresponding to the first data, the first data format being readable by a vehicle;
    obtaining, by the vehicle connector, vehicle diagnostic data in accordance with performing the diagnostic operation corresponding to the first data; and
    returning, by the vehicle connector, the vehicle diagnostic data to the vehicle diagnostic terminal by the remote communication connection,
    wherein the diagnostic instruction data is used to instruct the vehicle diagnostic terminal to convert the vehicle diagnostic data into second data in a second data format, and analyze and process the second data, and present an analysis result, and
    wherein the second data format is readable by the preset programming interface, and in terms of analyzing and processing the second data, and presenting an analysis result, the diagnostic instruction data is used to instruct the vehicle diagnostic terminal to: for each parameter in the vehicle diagnostic data,
        determine whether the parameter belongs to a preset parameter range corresponding to the parameter, and
        display a fault code and gives an indication that the parameter is an abnormality parameter upon determining that the parameter does not belong to the preset parameter range.

7. The method of claim 6, wherein the first data format is a standard format defined in controller area network bus (CANBUS) protocol, diagnostic communication over internet protocol (DOIP), keyword protocol (KWP), IOS 9141 protocol, SAE J1850 protocol, or a K-line protocol.

8. The method of claim 6, wherein the remote communication connection is performed in a server data forwarding manner or a peer-to-peer (P2P) communication manner.

9. A vehicle diagnostic terminal, comprising:
a memory, configured to store executable computer programs comprising a preset programming interface and a diagnostic application; and
a processor, configured to invoke the executable computer programs;
the executable computer programs which, when executed by the processor, are operable with the processor to carry out actions, comprising:
establishing, by the processor, a remote communication connection with a vehicle connector via the preset programming interface;
receiving, by the processor, diagnostic instruction data of the diagnostic application via the preset programming interface;
transmitting, by the processor, via the preset programming interface, the diagnostic instruction data to the vehicle connector by the remote communication connection, wherein the diagnostic instruction data is used to instruct the vehicle connector to convert the diagnostic instruction data into first data in a first data format and perform a diagnostic operation corresponding to the first data;
receiving, by the processor, vehicle diagnostic data returned by the vehicle connector, wherein the vehicle diagnostic data is obtained by performing, by the vehicle connector, the diagnostic operation corresponding to the first data;
converting, by the processor, the vehicle diagnostic data into second data in a second data format, wherein the second data format is readable by the preset programming interface; and
analyzing and processing the second data, and presenting an analysis result by:
for each parameter in the vehicle diagnostic data:
determining, by the vehicle diagnostic terminal, whether the parameter belongs to a preset parameter range corresponding to the parameter; and
displaying, by the vehicle diagnostic terminal, a fault code and giving, by the vehicle diagnostic terminal, an indication that the parameter is an abnormality parameter, upon determining, by the vehicle diagnostic terminal, that the parameter does not belong to the preset parameter range.

10. The vehicle diagnostic terminal of claim 9, wherein the executable computer programs are further operable with the processor to carry out the following before establishing the remote communication connection with the vehicle connector via the preset programming interface:
loading, by the processor, with the diagnostic application, the preset programming interface that meets a preset diagnostic standard.

11. The vehicle diagnostic terminal of claim 9, wherein the preset programming interface is a programming interface that meets a vehicle diagnostic standard.

12. The vehicle diagnostic terminal of claim 9, wherein the first data format is a standard format defined in controller area network bus (CANBUS) protocol, diagnostic communication over internet protocol (DOIP), keyword protocol (KWP), IOS 9141 protocol, SAE J1850 protocol, or K-line protocol.

13. The vehicle diagnostic terminal of claim 9, wherein the remote communication connection is performed in a server data forwarding manner or a peer-to-peer (P2P) communication manner.

14. A vehicle connector, comprising:
a memory, configured to store executable computer programs; and
a processor, configured to invoke the executable computer programs;
the executable computer programs which, when executed by the processor, are operable with the processor to carry out actions, comprising:
establishing, by the processor, a remote communication connection with a vehicle diagnostic terminal;
receiving, by the processor, diagnostic instruction data transmitted by the vehicle diagnostic terminal, the diagnostic instruction data being transmitted by a diagnostic application installed in the vehicle diagnostic terminal and being received via a preset programming interface of the vehicle diagnostic terminal;
converting, by the processor, the diagnostic instruction data into first data in a first data format;
performing, by the processor, a diagnostic operation corresponding to the first data, the first data format being readable by a vehicle;
obtaining, by the processor, vehicle diagnostic data in accordance with performing the diagnostic operation corresponding to the first data; and
returning, by the processor, the vehicle diagnostic data to the vehicle diagnostic terminal by the remote communication connection,
wherein the diagnostic instruction data is used to instruct the vehicle diagnostic terminal to convert the vehicle diagnostic data into second data in a second data format, and analyze and process the second data, and present an analysis result, and
wherein the second data format is readable by the preset programming interface, and in terms of analyzing and processing the second data, and presenting an analysis result, the diagnostic instruction data is used to instruct the vehicle diagnostic terminal to: for each parameter in the vehicle diagnostic data,
determine whether the parameter belongs to a preset parameter range corresponding to the parameter, and
display a fault code and give an indication that the parameter is an abnormality parameter upon determining that the parameter does not belong to the preset parameter range.

15. The vehicle connector of claim 14, wherein the first data format is a standard format defined in controller area network bus (CANBUS) protocol, diagnostic communication over internet protocol (DOIP), keyword protocol (KWP), IOS 9141 protocol, SAE J1850 protocol, or a K-line protocol.

* * * * *